(12) United States Patent
Hurley et al.

(10) Patent No.: US 8,021,707 B2
(45) Date of Patent: Sep. 20, 2011

(54) FILLED CONFECTIONARY PRODUCT AND PROCESS

(75) Inventors: Patrick L. Hurley, Bryan, OH (US); Stephen S. Kerr, Bryan, OH (US)

(73) Assignee: Spangler Candy Company, Bryan, OH (US)

( * ) Notice: Subject to any disclaimer, the term of this patent is extended or adjusted under 35 U.S.C. 154(b) by 1185 days.

(21) Appl. No.: 11/710,364

(22) Filed: Feb. 23, 2007

(65) Prior Publication Data
US 2008/0206409 A1 Aug. 28, 2008

(51) Int. Cl.
A23L 1/09 (2006.01)
A23G 3/20 (2006.01)
A23G 3/02 (2006.01)
A22C 13/00 (2006.01)

(52) U.S. Cl. ........ 426/572; 426/103; 426/284; 426/514; 426/516; 426/517

(58) Field of Classification Search .................. 426/572, 426/103, 284, 514, 516, 517
See application file for complete search history.

(56) References Cited

U.S. PATENT DOCUMENTS 1,242,562 A * 10/1917 Laskey .................... 99/450.2
6,623,266 B2 9/2003 Jani et al.

OTHER PUBLICATIONS

Jones, Aeration of Boiled Sweets: A Review of Availabel Methods, The Manufacturing Confectioner, Oct. 1995.*
baking911.com Temperature & Stages of Making Sugar Syrup Chart, Internet Archive, 2005.*
Spangler Candy Cane Tour, Internet Archive, 2002.*
Hammond's Filled Candy Canes, Internet Archive, 2004.*
Chocolate Filled 2-Ounce Peppermint Candy Canes: Set of 6. (2006) Retrieved May 26, 2009, from archived candywarehouse.com Web site: http://web.archive.org/web/20061016005648/http://www.candywarehouse.com/chococandycane.html.

* cited by examiner

*Primary Examiner* — Humera Sheikh
*Assistant Examiner* — Lela S Williams
(74) *Attorney, Agent, or Firm* — Shumaker, Loop & Kendrick, LLP

(57) ABSTRACT

A filled candy cane formed by injecting a soft candy into a hardening, elongate candy. A method and means for same.

9 Claims, 5 Drawing Sheets

US 8,021,707 B2

FILLED CONFECTIONARY PRODUCT AND PROCESS

BACKGROUND

1. Technical Field

The present invention relates to confectionary products, such as candy canes, and processes for manufacturing such products.

2. Background Information

In recent years, confectionary products having an outer layer different from an inner layer have gained popularity. For example, such confectionary products may include an outer layer of one flavor or consistency and an inner layer of a different flavor or consistency. Conventionally, such confectionary products have been made by hand. In particular, they are made by forming a long, rectangular-shaped log, which will become the outer layer, placing the inner layer within the log, and closing the log around the outer layer. The log is then rolled and formed into a rope, which is cut into small ropes or piece candy.

Unfortunately, conventional methods of making filled confectionary products suffer from a variety of drawbacks. One main drawback is the difficulty of making a large batch of hard candy filled with soft candy. This is particularly difficult as the large batch must be rolled and elongated on a batch roller. During this process, the soft candy may shift within or seep out of the hard candy log. This is particularly problematic when making candy canes, which include a crooked portion. Seeping of the soft candy results in a loss of the large batch of candy. An additional drawback of conventional methods of making filled confectionary products is the difficulty in making a product having an exterior and interior with a consistent or uniform thickness.

BRIEF SUMMARY

An object of the present invention is to improve upon or resolve the above-mentioned drawbacks. One embodiment of the invention includes a candy cane or other confectionary product that has a first end, a second end, and an axial portion therebetween. A hard candy forms seventy percent by weight (or more) of the confectionary product and a soft candy forms about thirty percent by weight (or less) of the confectionary product. The soft candy is disposed within at least a portion of the axial portion of the candy cane or other confectionary product. The candy can be provided with a crook disposed along the axial portion, thereby making it into a candy cane.

In another embodiment of the present invention, a method for forming a filled candy cane or other confectionary product is disclosed. The method involves injecting a batch of a hard exterior candy with a soft interior candy by using an elongate cannula in combination with a batch roller.

The invention will now be described in greater detail with reference to the following drawings.

DETAILED DESCRIPTION OF THE DRAWINGS AND THE PRESENTLY PREFERRED EMBODIMENTS

Figure 1:
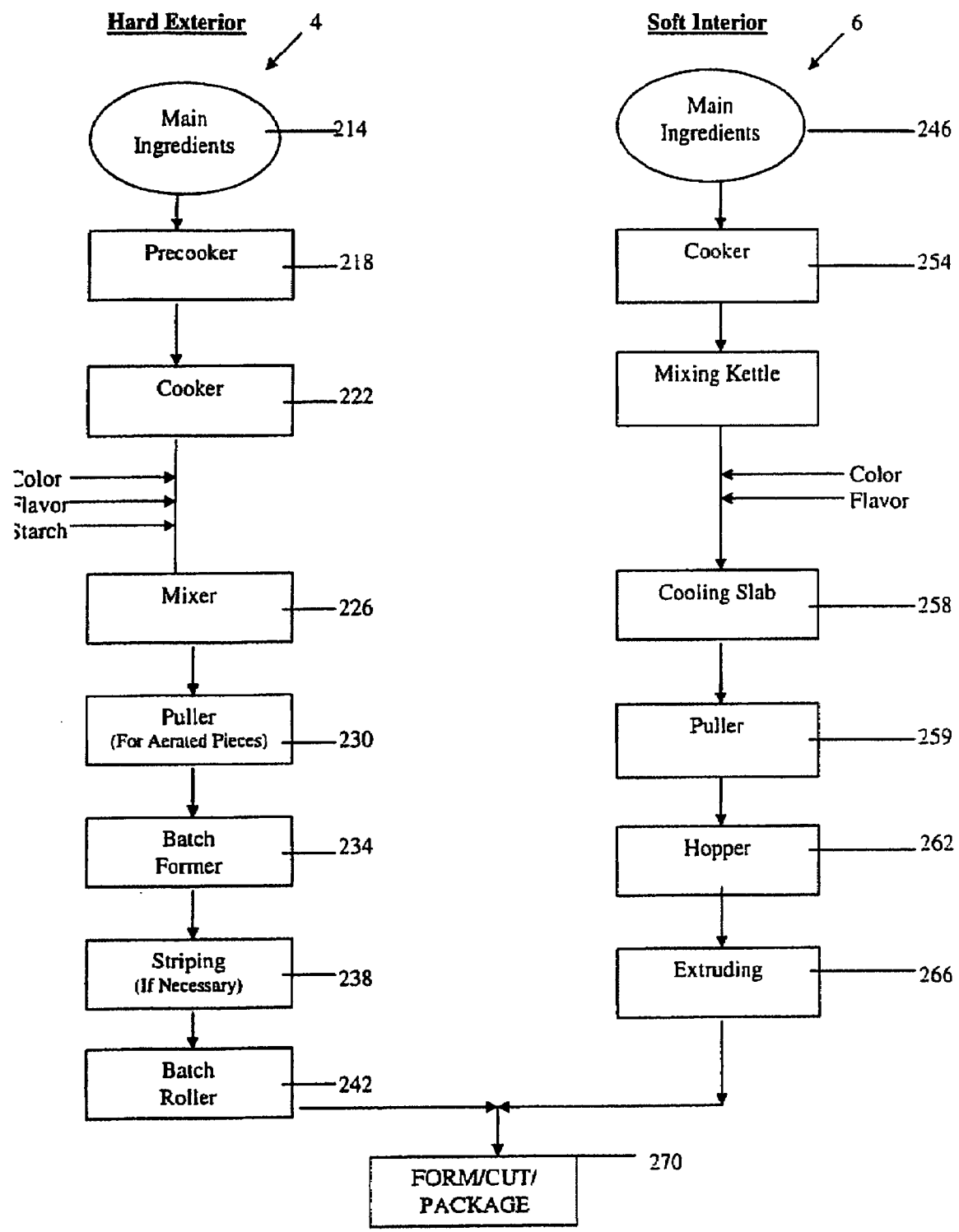
FIG. 1 is a flow chart of a method for making a filled candy according to one embodiment of the present invention.

The invention is described with reference to the drawings in which like elements are referred to by like numerals. The relationship and functioning of the various elements of this invention are better understood by the following detailed description. However, the embodiments of this invention as described below are by way of example only, and the invention is not limited to the embodiments illustrated in the drawings. It should also be understood that the drawings are not to scale and in certain instances details have been omitted, which are not necessary for an understanding of the present invention, such as conventional details of fabrication and assembly.

Figure 5:
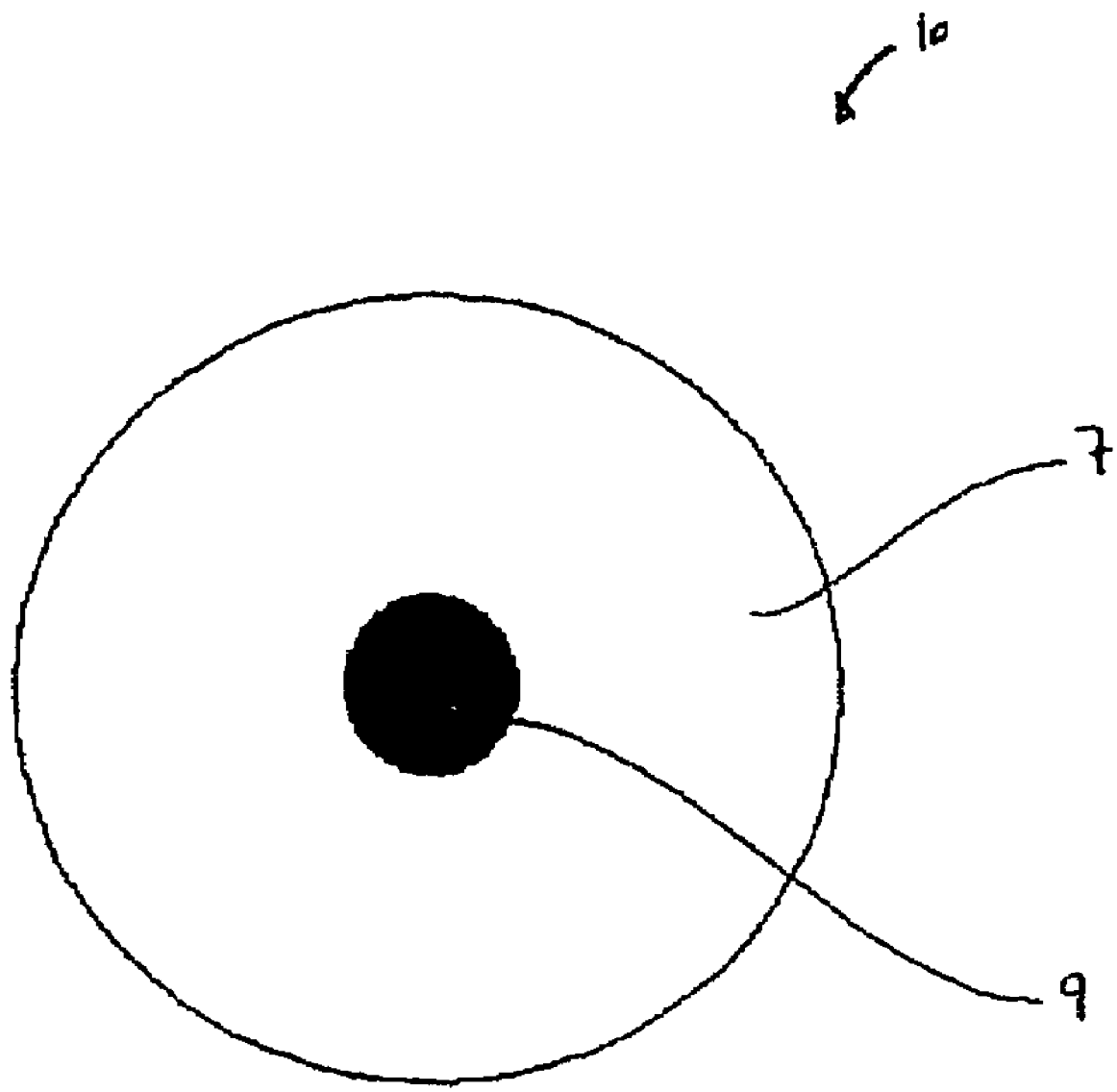
FIG. 5 is a cross sectional view of a filled candy according to one embodiment of the present invention.

FIG. 1 illustrates a flow chart of one embodiment of the present invention, and in particular, a method 10 for making a filled candy. The filled candy has a hard exterior made by a series of steps 4 and a soft interior made by a series of steps 6. In general, the hard exterior is made from a cooked, aerated or non-aerated mixture of corn syrup, sugar, color and flavor. The soft interior is made from a cooked, aerated mixture of corn syrup, sugar, coloring, cocoa powder and/or chocolate liqueur, as described in greater detail below. As illustrated in FIG. 5, the end product 10 has an interior soft candy 9 and a hard exterior candy 7. The exterior and interior are discussed in turn below.

Referring to FIG. 1, the hard exterior is made by adding approximately 100 pounds of main ingredients 214 to a cooking kettle. Main ingredients 214 include approximately 60 percent sugar (i.e., 60 pounds) and 40 percent corn syrup (i.e., 40 pounds). It should be noted that decreasing the percentage of sugar to about 57 percent and increasing the percentage of corn syrup to about 43 percent results in a more pliable candy. Main ingredients are then placed in a precooker (step 218) and heated to a temperature of about 226° F., although the temperature can range from 226° F. to 230° F. If the candy mixture appears grainy, the temperature should be raised until the graininess dissipates.

Referring to FIG. 1, after precooking the main ingredients 214, they are further cooked in a cooker, per step 222. In step 222, the hard candy mixture is cooked to a standard temperature of about 286° F., although the temperature can reach about 290° F. without adverse effect. The candy should be cooked until the moisture content is approximately between 1.0% and 2.0%. It should be noted that if the candy mixture is runny or grainy, the cook temperature can be increased to 288° F. Moreover, if the candy mixture begins cracking, the cook temperature should be monitored closely to ensure that it is not too high or low.

Prior to placing the candy mixture into the mixer, it is placed on a cold slab. The cold slab is a water-cooled table, as is known to those of ordinary skill in the art. While on the cold slab, color, flavor (such as peppermint or raspberry), acids, and starch are added to the mixture. Approximately 6 ounces of starch is added to contain the flavor in the candy mixture.

Once cooked and flavored, the main ingredients 214 are moved for cooling to a mixer, as shown in step 226, for further cooling. The mixer includes a table, on which the candy mixture is placed. Two shovels and a plunger are then used to further mix and cool the candy mixture. The table, shovels, and plunger can all be water-cooled. The candy mixture is removed from the mixer when it has reached a desired firmness, as determined by feel and sight. It is important that batches of the candy mixture are removed from the mixer with consistent firmness and color so as to result in a consistent end product. Moreover, pulling the mixture off the mixer while it is too soft will result in feeding problems in later steps. On the other hand, pulling it off after it is too hard can cause cracking problems.

Next, in step 230, the candy mixture is placed onto a puller for aerated candy. This step is bypassed for non-aerated pieces. The puller aerates the candy, thus giving it a white color. The puller pulls the candy slowly for about 10 seconds and then shifts to a high speed cycle for a period of about 28 seconds. The entire cycle should last approximately 38 seconds. Any necessary adjustments should be made on the high speed cycle. In general, the softer the pulled batch, the more air that is incorporated into the batch. Excessive pulling can result in the batch becoming an off-white color. In addition, excessive pulling can result in feeding problems in later steps. If, on the other hand, the batch is too hard when it is pulled, it may break apart.

Following the pulling step, the candy mixture is placed into a batch former in step 234. The batch former forms the batch into a cylindrical shape. The batch former is preferably gas heated to prevent the batch from cooling excessively. Candy cane stripes can then be added to the candy mixture in striping step 238. The stripes are formed from approximately 10 to 15 pounds of colored candy. The stripes are then adhered to the candy mixture by spraying the stripes with a small amount of water and pressing them onto the hard exterior batch.

The hard exterior is then placed into a batch roller in step 242. The batch roller is configured to reduce the diameter of the candy mixture to a desired size. The batch roller can be electrically heated to avoid excessive cooling. If heated excessively, the stripes in the candy mixture may bleed. The candy mixture may also stretch out excessively during rolling. On the other hand, if the mixture cools excessively, it may cause cracking in later steps. Operation of a batch roller will be apparent to a person of ordinary skill in the art. The hard exterior is then placed onto the batch roller in preparation for injection of the soft interior, as described in greater detail below.

The soft interior can be made simultaneously to the hard exterior. The soft interior 6 can be made into approximately 60 pound batch yields. Such batches include approximately 32.5 pounds of corn syrup, 3 gallons of liquid sugar, 7.5 pounds of invert sugar, 5 pounds of vegetable oil, 4.5 pounds of cocoa powder or chocolate liqueur, 4 ounces of caramel color, 0.25 ounces of Lecithin, 6 ounces of flavor, and 6 ounces of salt. All ingredients except the color, flavor, and cocoa powder, are combined and cooked to a temperature between about 255° F. and 266° F. in steps 250 and 254. In general, a lower cook temperature will result in a softer interior. The soft interior candy mixture is then placed in a mixing kettle and color, flavor, and cocoa powder are added to the mixture. The candy mixture is then placed onto a greased slab, and eventually onto a greased puller, for aeration. The candy mixture should be cooled to a temperature of approximately 120° F. prior to pulling. Once the mixture is pulled, it is ready to be placed into the hopper 30 of the confectionary injection machine 100, as shown in step 262. From the hopper 30, the soft interior candy mixture is extruded into the hard exterior candy mixture as the hard exterior candy mixture is fed down the batch roller in step 242.

It is important to note that the soft interior should comprise approximately 10-20% of the entire finished candy cane. It has been discovered that making candy canes with more than 30% soft interior filling results in excessive cracking of the finished confectionary product.

Referring to FIGS. 2-4A, a confectionary extruding machine 100 is used to consistently extrude the soft interior candy into the hard exterior candy. Machine 100 generally includes an extruder 14, a hopper 30, and a cannula 34.

Figure 2:
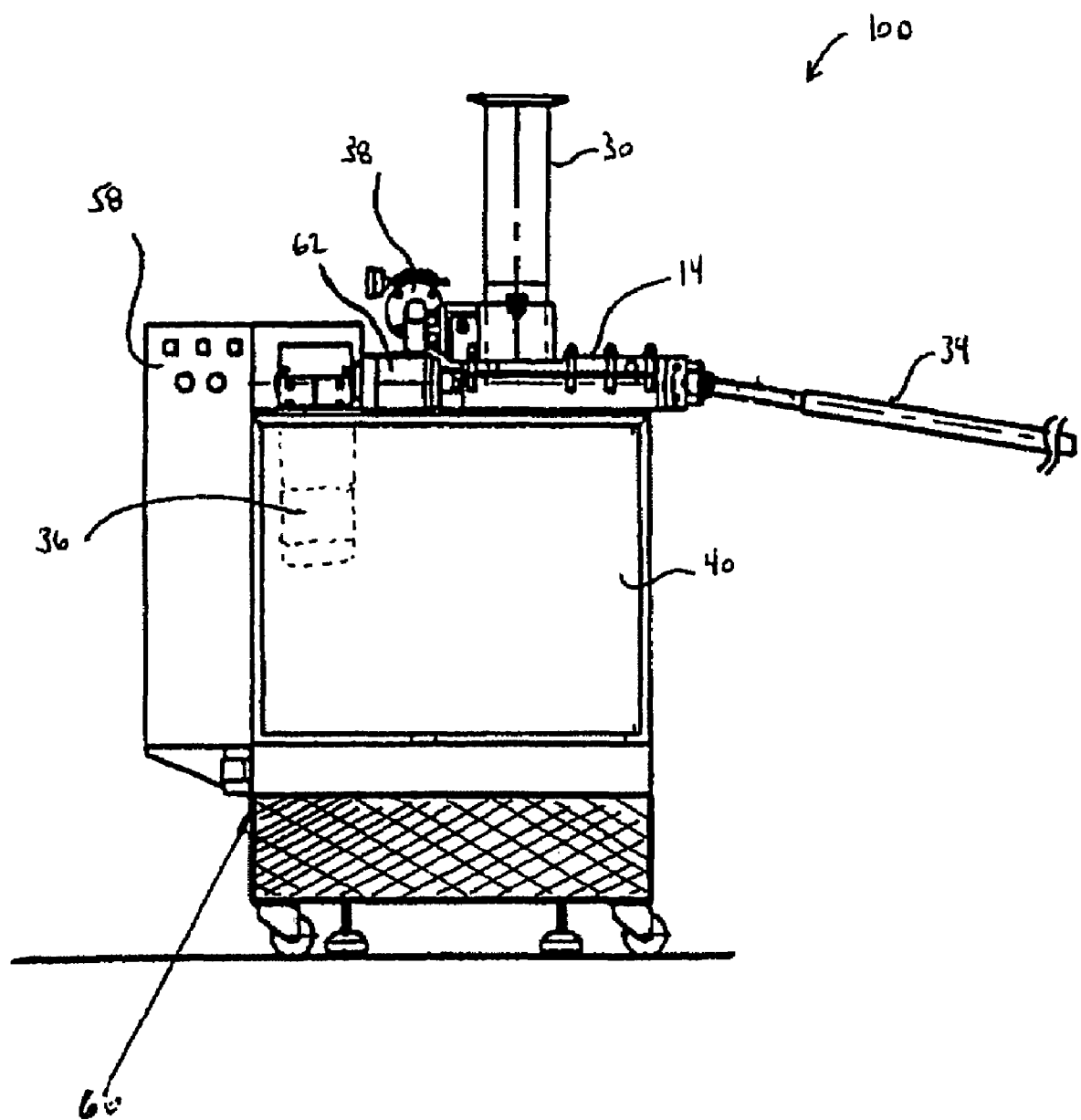
FIG. 2 is a side view of an extruder for forming and injecting filling in a hard candy jacket according to one embodiment of the present invention.
Figure 3:
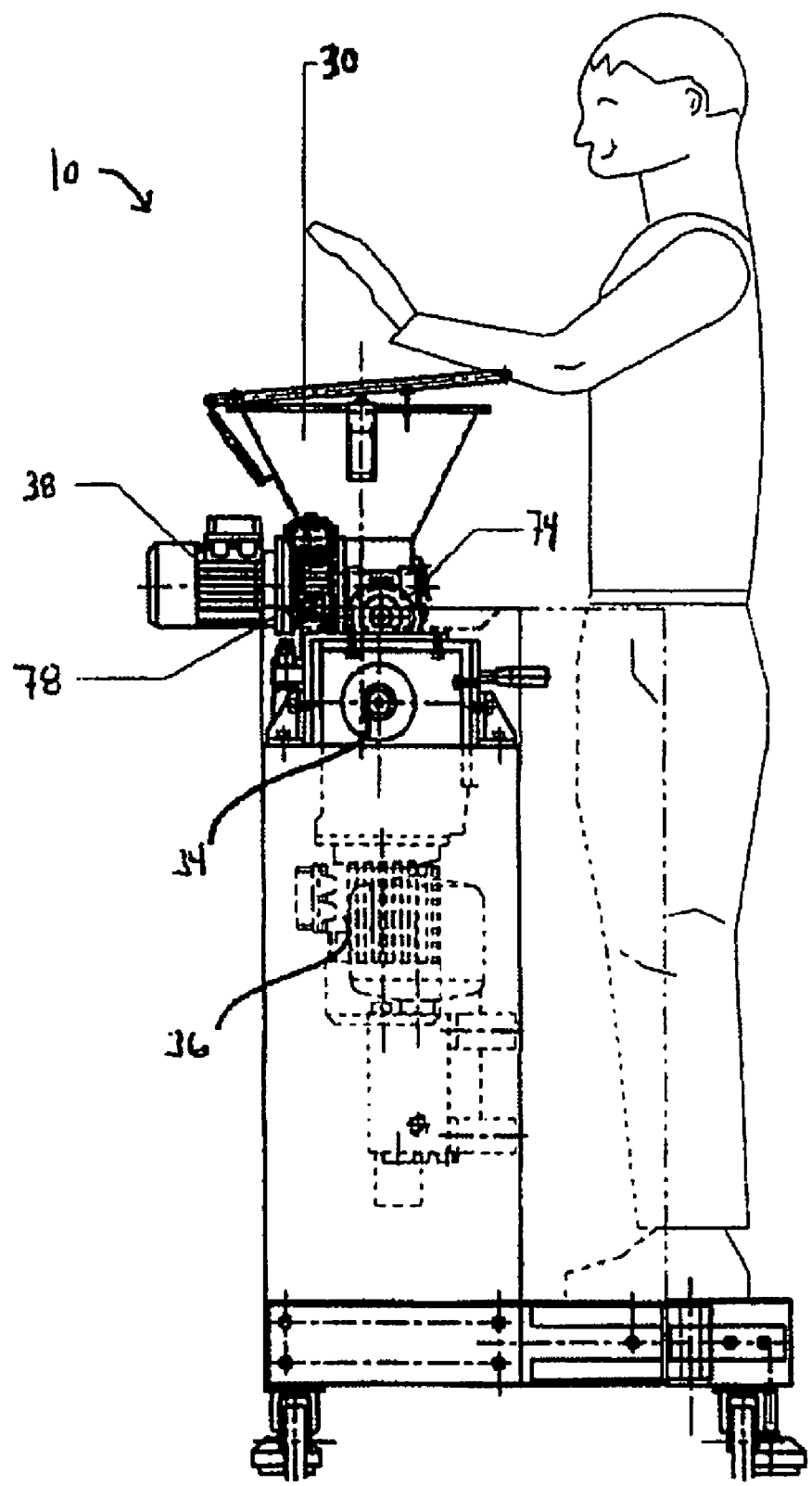
FIG. 3 is a front view of an extruder for forming and injecting filling in a hard candy jacket according to one embodiment of the present invention.
Figures 4, 4A:
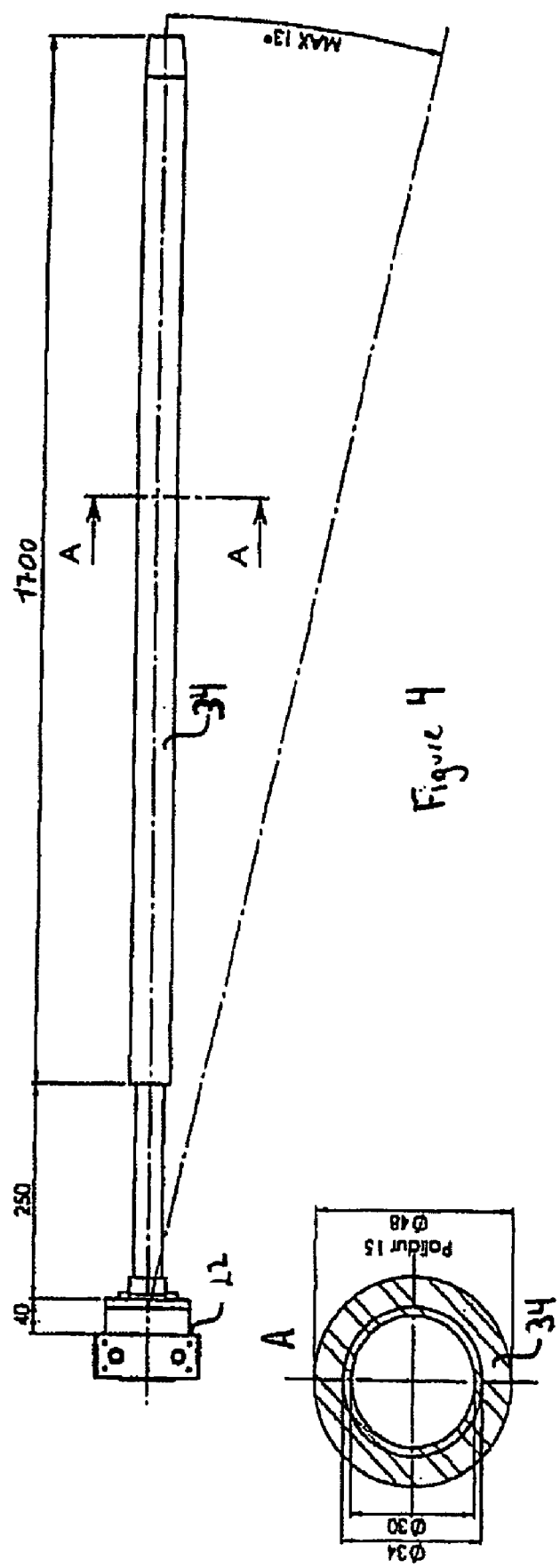
FIG. 4 is side view of a cannula according to one embodiment of the present invention.
FIG. 4A is a cross section of a cannula according to one embodiment of the present invention.

As illustrated in FIGS. 2 and 3, the confectionary extruding machine 100 includes an extruder 14. Extruder 14 can be, for example, a 142/ES/LAB Extruder, as manufactured by nuova EUROMEC S.r.l. of Italy. The extruder is capable of uniformly and continuously extruding one or more ropes of soft interior candy, as described in greater detail below. Extruder 14 includes a sturdy frame 40 formed from painted steel. It is also provided with a hopper 30 for product loading. Hopper 30 is made of AISI 420 stainless steel and has a capacity of approximately 10 liters. Moreover, hopper 30 is polytetrafluoroethylene ("PTFE") coated to avoid sticking of the soft interior candy.

As illustrated in FIG. 2, confectionary extruding machine 100 further includes a cannula 34 for extruding the soft interior candy into the center of the hard exterior candy. Cannula 34 is PTFE coated so that the hard exterior candy does not stick to it. Cannula 34 is disposed coaxially with the batch roller. In addition, cannula 34 should be sufficiently long to extend coaxially over a batch roller, on which the hard candy exterior is rolled.

In use, the hard exterior candy is placed onto the batch roller and wrapped around or pressed onto the cannula 34. The batch roller is then activated, causing the batch to roll coaxially relative to the cannula 34. The soft interior candy can then be extruded through the cannula 34 (in step 266) and into the hard exterior candy as the hard exterior candy elongates on the batch roller. This results in an uninterrupted extruding of the soft interior candy into the entire batch of hard exterior candy.

The soft interior candy is processed and extruded into the hard exterior candy as follows. The soft interior candy is placed into the hopper 30 (shown in FIG. 3). From hopper 30, the soft interior candy is fed through extruding screws or augers, into extruder die head 22, and ultimately out of the distal end of cannula 34. The extruding screws or augers are disposed within an extruder chamber below hopper 30.

As shown in step 270, once the hard exterior candy is rolled and extruded with the soft interior candy, it is then cut into appropriate rope lengths and packaged. A crook is then added to the candy cane, if desired. As illustrated in FIG. 5, the end product has an interior soft candy 9 and a hard exterior candy 7.

It is therefore intended that the foregoing detailed description be regarded as illustrative rather than limiting, and that it be understood that it is the following claims, including all equivalents, that are intended to define the spirit and scope of this invention.

The invention claimed is:

1. A process for manufacturing a confectionary product, the process consisting of:
  a) providing a batch of hardening candy;
  b) heating the batch of hardening candy to a temperature between 286° Fahrenheit and 290° Fahrenheit, wherein the hardening candy has a moisture content between 1.0% and 2.0%;
  c) aerating the batch of hardening candy for less than approximately 38 seconds;

d) forming the batch of hardening candy into an elongate configuration having a first end, a second end, and an elongate portion therebetween;
e) providing a batch of soft candy;
f) heating the batch of soft candy to a temperature between 255° Fahrenheit and 266° Fahrenheit;
g) providing a confectionary extruding machine, comprising:
a hopper;
an auger operably connected to the hopper; and
an elongate cannula operably connected to the auger;
h) providing a batch roller coaxially disposed relative to the elongate cannula;
i) placing the batch of hardening candy on the batch roller;
j) rolling the hardening candy; and
k) extruding the batch of soft candy through the elongate cannula into the batch of hard candy as said hard candy elongates, thereby forming rope having a hardening candy exterior contacting a soft candy interior.

2. The process of claim 1, wherein the extruding step consists of injecting an amount of less than 30 percent of soft candy relative to the total amount of the combined soft candy and hardening candy.

3. The process of claim 1, wherein the extruding step consists of injecting an amount of between about 10% and 20% of soft candy relative to the total amount of the combined soft candy and hardening candy.

4. The process of claim 3, wherein the soft candy comprises cocoa and the hardening candy comprises peppermint.

5. The process of claim 3, wherein the soft candy is selected from the group consisting of cocoa powder and chocolate liqueur; and the hardening candy comprises raspberry flavor.

6. A process for manufacturing a confectionary product, the process consisting of:
a) providing a batch of hardening candy;
b) heating the batch of hardening candy to a temperature between 286° Fahrenheit and 290° Fahrenheit, wherein the hardening candy has a moisture content between 1.0% and 2.0%;
c) providing a mixer, placing the hardening candy on the mixer to reduce the temperature of the hardening candy below 286° Fahrenheit;
d) aerating the batch of hardening candy for less than approximately 38 seconds;
e) forming the batch of hardening candy into an elongate cylindrical configuration having a first end, a second end, and an elongate portion therebetween;
f) providing a batch of soft candy;
g) heating the batch of soft candy to a temperature between 255° Fahrenheit and 266° Fahrenheit;
h) providing a confectionary extruding machine, comprising:
a hopper;
an auger operably connected to the hopper; and
an elongate cannula operably connected to the auger;
i) providing a batch roller coaxially disposed relative to the elongate cannula;
j) placing the batch of hardening candy on the batch roller;
k) rolling the hardening candy; and
l) extruding the batch of soft candy through the elongate cannula into the batch of hard candy as said hard candy elongates, thereby forming rope having a hardening candy exterior contacting a soft candy interior, wherein the extruding step consists of injecting an amount of less than 30 percent of soft candy relative to the total amount of the combined soft candy and hardening candy.

7. A process for manufacturing a confectionary product, the process consisting of:
a) providing a batch of hardening candy;
b) heating the batch of hardening candy to a temperature between 286° Fahrenheit and 290° Fahrenheit, wherein the hardening candy has a moisture content between 1.0% and 2.0%;
c) providing a mixer, placing the hardening candy on the mixer to reduce the temperature of the hardening candy below 286° Fahrenheit;
d) aerating the batch of hardening candy for less than approximately 38 seconds;
e) providing a batch former, forming the batch of hardening candy into an elongate cylindrical configuration having a first end, a second end, and an elongate portion therebetween;
f) providing a batch of soft candy;
g) heating the batch of soft candy to a temperature between 255° Fahrenheit and 266° Fahrenheit;
h) providing a confectionary extruding machine, comprising:
a hopper;
an auger operably connected to the hopper; and
an elongate cannula operably connected to the auger;
i) providing a batch roller coaxially disposed relative to the elongate cannula;
j) placing the batch of hardening candy on the batch roller;
k) rolling the hardening candy; and
l) extruding the batch of soft candy through the elongate cannula into the batch of hard candy as said hard candy elongates, thereby forming rope having a hardening candy exterior contacting a soft candy interior, wherein the extruding step consists of injecting an amount of less than 30 percent of soft candy relative to the total amount of the combined soft candy and hardening candy.

8. A process for manufacturing a confectionary product, the process consisting of:
a) providing a batch of hardening candy;
b) heating the batch of hardening candy to a temperature between 286° Fahrenheit and 290° Fahrenheit, wherein the hardening candy has a moisture content between 1.0% and 2.0%;
c) aerating the batch of hardening candy for less than approximately 38 seconds;
d) forming the batch of hardening candy into an elongate cylindrical configuration having a first end, a second end, and an elongate portion therebetween;
e) providing a batch of soft candy;
f) heating the batch of soft candy to a temperature between 255° Fahrenheit and 266° Fahrenheit;
g) providing a confectionary extruding machine, comprising:
a hopper;
an auger operably connected to the hopper; and
an elongate cannula operably connected to the auger;
h) providing a batch roller coaxially disposed relative to the elongate cannula;
i) placing the batch of hardening candy on the batch roller;
j) rolling the hardening candy; and
k) extruding the batch of soft candy through the elongate cannula into the batch of hard candy as said hard candy elongates, thereby forming rope having a hardening candy exterior contacting a soft candy interior; and
l) bending a portion of the rope into a crook.

9. A confectionary product having a hard exterior and a soft interior formed from hardening candy and soft candy, the hardening candy is heated to a temperature between 286°

Fahrenheit and 290° Fahrenheit, wherein the hardening candy has a moisture content between 1.0% and 2.0%, the batch of hardening candy is aerated for less than approximately 38 seconds, the hardening candy is formed into an elongate configuration, the configuration having a first end, a second end, and an elongate portion between said first and second ends, the soft candy is heated to a temperature between 255° Fahrenheit and 266° Fahrenheit, the hardening candy is placed on a batch roller, the batch roller is coaxially disposed relative to an elongate cannula of a confectionary extruding machine, the machine comprising a hopper, an auger operatively connected to the hopper, and said cannula operably connected to the auger, the hardening candy is rolled on said roller, and the soft candy is extruded through the cannula into the hard candy as the hard candy elongates, thereby forming rope having a hardening candy exterior contacting a soft candy interior.

* * * * *